(No Model.)
J. A. MITCHELL.
HEDGE.
No. 380,449.  Patented Apr. 3, 1888.
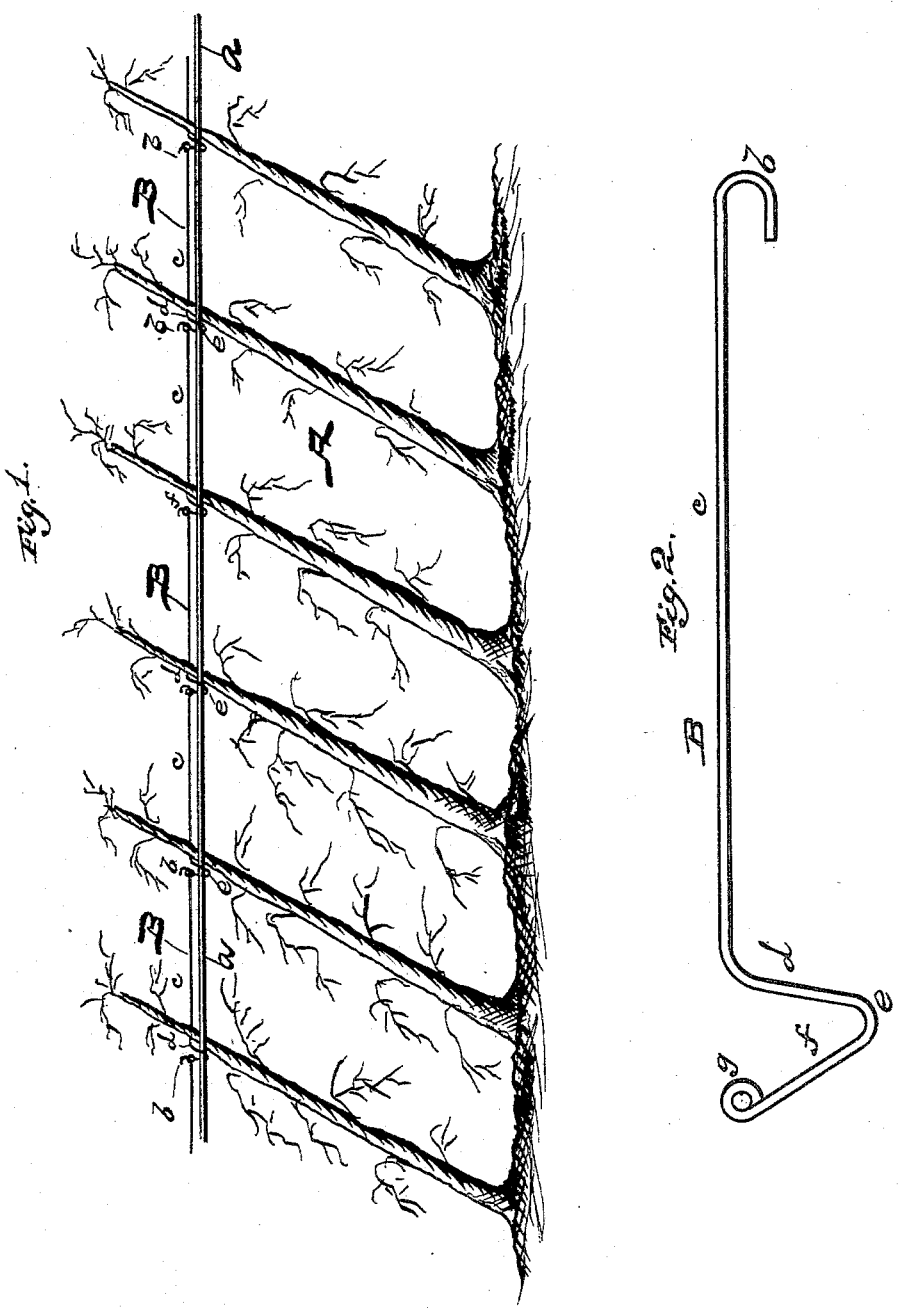
WITNESSES.
J. N. Walker
E. E. Bates
INVENTOR.
J. A. Mitchell
by E. H. Bates
Attorney.

United States Patent Office.

JAMES A. MITCHELL, OF WESTMINSTER, MARYLAND.

HEDGE.

SPECIFICATION forming part of Letters Patent No. 380,449, dated April 3, 1888.

Application filed January 5, 1888. Serial No. 259,890. (No model.)

*To all whom it may concern:*

Be it known that I, JAMES A. MITCHELL, a citizen of the United States, residing at Westminster, in the county of Carroll and State of Maryland, have invented certain new and useful Improvements in Hedges; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in hedges; and it consists in the novel construction of a binding-wire which is used in combination with one or more line-wires for retaining the stalks of a hedge in the desired oblique position.

The annexed drawings, to which reference is made, fully illustrate my tie or holding wire, in which—

Figure 1 represents a side view of a hedge, showing my device applied; and Fig. 2 is a perspective view of the tie-wire detached from the hedge.

Referring by letter to the accompanying drawings, A designates a hedge having a top horizontal line-wire, $a$, and B indicates my tie-wire, which is designed to hold the stalks on an incline, as shown in the drawings. This wire-fastener is of a peculiar construction, designed not only to connect to one another in pairs, but to form a loop in combination with the line-wire for the stalk to project through, and the same consists of a single wire having at one end a hook, $b$, extending from which is the horizontal portion $c$. The wire is bent at right angles, as at $d$, and is again bent at $e$, forming a V-shaped hook, $f$, and having an eye, $g$, formed in its end, as shown in the drawings.

It will be seen by reference to the annexed drawings that my device is used only in combination with a line-wire or rail, and in connecting the stalk to said rail or wire the right-angular portion is carried on the opposite side of the stalk to that where the line-wire runs and the V-shaped portion is hooked to said wire, thus forming a loop for the stalk, and at the same time holding the latter to said line-wire. In continuing the fence the hook of the next tie or fastener is inserted into the eye of the adjoining tie-wire and the same operation is repeated, thus forming a continuous connection of the tie-wire with a loop between each for the stalks.

I do not confine myself to any particular line-wire, as my device can be used in combination with any. Should it be desired, my device can be readily used with a wire fence running parallel with a hedge simply by connecting any or all of the horizontal wires with said hedge by combining therewith my device in the manner above described.

What I claim is—

In a hedge fence, the combination, with the inclined plants and the line-wire, of the tie-wires B, each consisting of the wire $c$, having at one end the hook $b$ and bent at the opposite end, as at $d$, and again at $e$, to form a V-shaped portion, $f$, having the eye $g$, said tie-wires being joined together and the V-shaped portion looped to the line-wire, substantially as described.

In testimony whereof I affix my signature in presence of two witnesses.

JAMES A. MITCHELL.

Witnesses:
   JOHN N. WALKER,
   EMORY H. BATES.